[22.]

T. Laux. Wagon Reach.

No. 118,540.    Patented Aug. 29, 1871.

Witnesses:    Inventor:
A. W. Almqvist    T. Laux.
Wm. H. C. Smith.
    Per  [signature]
    Attorneys.

UNITED STATES PATENT OFFICE.

THOMAS LAUX, OF BUCYRUS, OHIO.

IMPROVEMENT IN WAGON-REACHES.

Specification forming part of Letters Patent No. 118,540, dated August 29, 1871.

*To all whom it may concern:*

Be it known that I, THOMAS LAUX, of Bucyrus, in the county of Crawford and State of Ohio, have invented a new and useful Improvement in Wagon-Reach; and I do hereby declare that the following is a full, clear, and exact description thereof, which will enable others skilled in the art to make and use the same, reference being had to the accompanying drawing forming part of this specification, in which—

Figure 1:
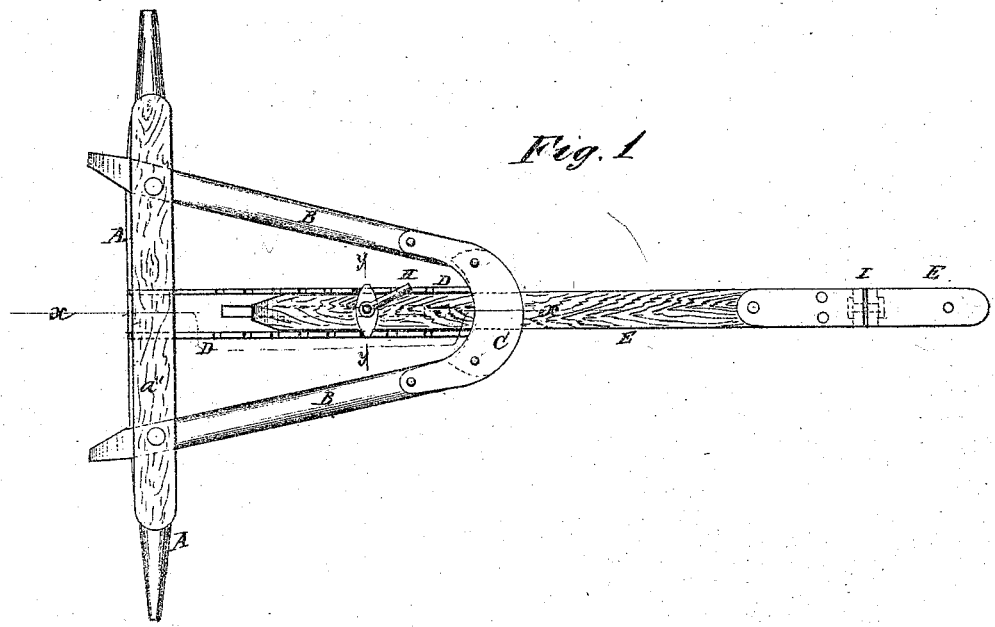
Figure 2:
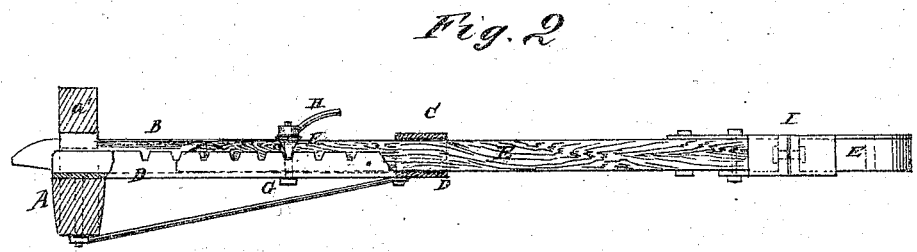
Figure 3:
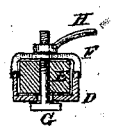

Figure 1 is a top view of my improved reach as attached to the rear axle and hounds. Fig. 2 is a detail sectional view of the same taken through the line $x\,x$, Fig. 1. Fig. 3 is a detail cross-section of the same taken through the line $y\,y$, Fig. 1.

Similar letters of reference indicate corresponding parts.

My invention has for its object to furnish an improved wagon-reach, which shall be so constructed that it may be conveniently lengthened and shortened as required, and which will prevent the reach and hounds from being twisted or strained should one of the wheels drop into a hole or rise in passing over an obstruction; and it consists in the construction and combination of various parts of the reach, as hereinafter more fully described.

A represents the rear axle, to which the rear ends of the rear hounds B are attached in the ordinary manner. The forward ends of the rear hounds B are connected by a metallic plate, C, attached to their upper sides, and by the forward end of the metallic plate D attached to their under sides, thus forming a guide-socket to receive the reach E. The metallic plate D extends back to and is secured in a hole in the axle A, or between it and the bolster $a'$. The sides of the plate D are turned up, as shown in Figs. 1, 2, and 3, thus forming a channel to receive the reach E. The edges of the plate D are notched, as shown in Figs. 1 and 2, to receive the ends or points of the catch F, which extends across the upper side of the reach E, and the ends of which are bent down upon the sides of the reach E to enter the notches in the edges of the plate D. The catch F is secured in place when adjusted by the bolt G, which passes through a longitudinal slot in the plate D and through a hole in the reach E, and has a hand-nut, H, screwed upon its upper end.

By this construction, by turning up the nut H and raising the catch F, the reach may be slid along in the channel-plate D to adjust it longer or shorter, as may be desired.

In the forward part of the reach E is formed a swiveled joint, I, which is formed by attaching metallic caps, connected by a swivel-bolt, to the adjacent ends of the parts of the reach.

By this construction, should one of the wheels descend below or rise above the level of the others, the swivel-joint in the reach E will prevent the reach or hounds from being twisted or strained.

In the forward end of the reach E is formed a hole to receive the king-bolt in the ordinary manner.

Having thus described my invention, I claim as new and desire to secure by Letters Patent—

In combination with axle A, hounds B, and reach E, the plates C D, catch F, clamp G H, and joint I, all constructed and arranged as and for the purpose described.

THOMAS LAUX.

Witnesses:
D. KEPLIRGER,
SAML. S. CALDWELL.